United States Patent [19]

Bertelson

[11] Patent Number: 5,020,857
[45] Date of Patent: Jun. 4, 1991

[54] USE OF FLUID DYNAMIC RESTRICTOR FOR LOWERING DUMP TRUCK BEDS

[76] Inventor: Peter C. Bertelson, 30325 Ponds View Dr., Franklin, Mich. 48025

[21] Appl. No.: 468,609

[22] Filed: Jan. 23, 1990

[51] Int. Cl.$^5$ .............................................. B60P 1/28
[52] U.S. Cl. .............................. 298/22 R; 298/22 C
[58] Field of Search ................ 188/320; 137/810, 813, 137/808; 298/22 C, 22 R; 16/82, 84, DIG. 9

[56] References Cited

U.S. PATENT DOCUMENTS

| | | |
|---|---|---|
| 1,165,825 | 12/1915 | Wood . |
| 2,517,153 | 8/1950 | Wood . |
| 2,667,793 | 2/1954 | Webster . |
| 3,135,529 | 6/1964 | Conrad . |
| 3,511,257 | 5/1970 | Chow .................................. 137/813 |
| 3,695,710 | 10/1972 | Cresci et al. . |
| 3,743,222 | 7/1973 | Smith ................................. 188/320 |
| 3,921,128 | 11/1975 | Snead . |
| 4,003,601 | 1/1977 | Gerding . |
| 4,029,359 | 6/1977 | Glomski . |
| 4,182,534 | 1/1980 | Synder . |
| 4,236,757 | 12/1980 | Gregory . |
| 4,318,658 | 3/1982 | McIntyre . |
| 4,442,925 | 4/1984 | Fukushima et al. ................ 188/320 |
| 4,508,388 | 4/1985 | Minami . |
| 4,823,807 | 4/1989 | Russell . |
| 4,830,053 | 5/1989 | Shaw .................................. 137/808 |

FOREIGN PATENT DOCUMENTS

| | | |
|---|---|---|
| 120123 | 9/1979 | Japan . |
| 126325 | 10/1979 | Japan . |
| 932067 | 5/1982 | U.S.S.R. . |
| 106030 | 6/1983 | U.S.S.R. . |

*Primary Examiner*—Robert J. Spar
*Assistant Examiner*—Craig Slavin
*Attorney, Agent, or Firm*—Arnold, White & Durkee

[57] ABSTRACT

A fluid dynamic restrictor limits the speed at which the bed of a dump truck can be lowered by discharging fluid from a lift cylinder. The fluid dynamic restrictor defines a fluid vortex that provides a pressure drop proportional to the square of the fluid flow rate. Therefore the maximum rate at which the bed can be lowered is much the same regardless of whether the bed is empty or full. In contrast to a restrictor in the form of a throttled valve or wire mesh, the fluid dynamic restrictor is not easily plugged by debris. The fluid dynamic restrictor also offers little resistance in its reverse direction, which facilitates rapid lifting of the bed.

7 Claims, 1 Drawing Sheet

USE OF FLUID DYNAMIC RESTRICTOR FOR LOWERING DUMP TRUCK BEDS

BACKGROUND OF THE INVENTION

1. Field of the Invention

The present invention relates to the supply of fluid under pressure to the lift cylinder of a dump truck for raising the bed of the truck from its chassis, and to the lowering of the bed at a controlled rate by limiting the discharge of the fluid from the lift cylinder.

2. Description of the Related Art

Hydraulic lift mechanisms for vehicles such as dump trucks are well known. A piston and cylinder are mounted between the chassis and the bed of the truck. A hydraulic pump is connected to a transmission power take-off. The pump receives fluid from a reservoir and supplies the fluid under pressure to the lift cylinder. A slide valve is used to shut off the supply of fluid to the cylinder and bypass the pump after the bed has been raised. To lower the bed, the slide valve is operated to discharge fluid from the cylinder back to the reservoir.

Additional controls have been added to the hydraulic lift mechanism of a dump truck to provide ease of operation and improved safety. Gregory U.S. Pat. No. 4,236,757, for example, discloses the use of a flexible cable and control knob for remotely actuating the slide valve in the hydraulic lift. The control knob is fitted with a safety latch for precluding inadvertent raising or lowering of the truck bed.

Cresci et al. U.S. Pat. No. 3,695,710 discloses a control, in which the fluid under pressure is supplied to the hydraulic cylinder only when the gear shift lever of the transmission is in neutral and the brakes of the vehicle have been applied. When it is desired to lower the truck bed, a solenoid valve is energized to release fluid from the cylinder and return it to a reservoir through a pipe. It is said that a restrictor in the return line reduces the fluid flow so that the piston gradually returns to its lowest position.

Japan 54-120123 discloses a control for the hydraulic lift of a dump truck in which the bed is lowered by draining fluid through a control valve that is throttled in accordance with the size of the dump angle of the bed to relax the impact between the bed and the truck body. The throttle valve is constructed in a housing including a check valve connected in parallel with the throttle valve.

Japan 54-126325 discloses a pneumatic system for indirect operation of the slide valve controlling the hydraulic lift of a dump truck. To lower the hydraulic lift, high pressure air is fed to an air cylinder to push a valve rod into the slide valve. To decrease the speed at which the hydraulic lift is lowered, the rate at which the valve rod is pushed into the slide valve is limited by limiting the flow of exhaust air from the air cylinder. A check valve forces the exhaust air to flow through a throttle valve. Therefore, the throttle valve gradually exhausts the air from the air cylinder so as to elongate the stroke operation time of the slide valve.

Despite the widespread use of hydraulic lift controls, a substantial number of people continue to be killed by the accidental lowering of dump truck beds. This is probably due in part to the use of inexpensive flexible cables for remotely operating the slide valve from the cab of the truck. The flexible cables are subject to wear, corrosion, and overload, and tend to jam or lock. In some of these cases, the operators reach or stand under the raised dump truck body to operate the slide valve with their arms, and are unaware that the truck bed can drop almost instantly. Although this sad situation could be corrected to some degree by the use of better hydraulic lift controls, such controls are more expensive and may introduce additional long term reliability problems. Electrical and pneumatic controls, for example, are subject to potential loss of electrical or pneumatic power. Hydraulic controls such as throttle valves are subject to wear and clogging by particulate contamination.

SUMMARY OF THE INVENTION

The primary object of the present invention is to prevent injury from sudden or unexpected lowering of dump truck beds caused by unusually heavy loads or failures in the hydraulic lift controls.

A specific object is to provide a reliable and inexpensive mechanism for limiting the rate at which a dump truck bed is lowered to a predetermined maximum rate that is much the same regardless of whether the bed is empty or full.

Briefly, in accordance with the present invention, a fluid dynamic restrictor limits the speed at which the bed of a dump truck can be lowered by discharging fluid from a lift cylinder. The fluid dynamic restrictor defines a fluid vortex that provides a pressure drop proportional to the square of the fluid flow rate. Therefore the maximum rate at which the bed can be lowered is much the same regardless of whether the bed is empty or full. In contrast to a restrictor in the form of a throttled valve or wire mesh, the fluid dynamic restrictor is not easily plugged by debris. The fluid dynamic restrictor also offers little resistance in its reverse direction, which facilitates rapid lifting of the bed.

BRIEF DESCRIPTION OF THE DRAWINGS

Other objects and advantages of the invention will become apparent upon reading the following detailed description and upon reference to the drawings in which.

Figure 1:
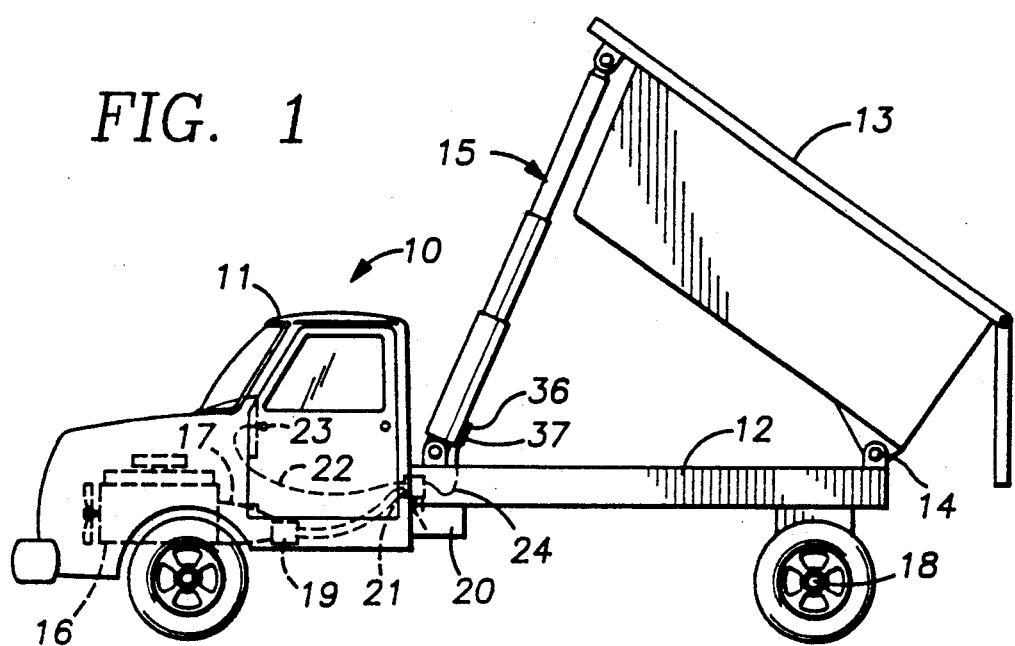
FIG. 1 is a side view of a vehicle having a bed which is raised and lowered by a hydraulic lift which may advantageously use the control mechanism of the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, there is shown in FIG. 1 a vehicle 10 which may advantageously employ the control mechanism of the present invention. The vehicle 10 is of the type commonly referred to as a "dump truck" which includes a cab 11, a chassis or frame 12, and a dump bed 13 connected to the chassis 12 at a pivot point 14. To raise and lower the bed 13 about the pivot point 14, a hydraulic cylinder and piston assembly 15 is coupled between the chassis 12 and the bed 13.

For propelling the vehicle 10, the vehicle has an engine 16 and transmission 17 connected via a power train (not shown) to the rear axle 18. For raising the bed 13, a hydraulic pump 19 is also connected to the transmission 17. The pump 19 receives hydraulic fluid from a reservoir 20 and delivers pressurized fluid to the piston and cylinder assembly 15 to raise the bed 13.

For controlling the delivery of fluid to and from the piston and cylinder assembly 15, the vehicle 10 is equipped with a customary three-position slide valve 21 operated by a flexible control cable 22. The control cable 22 links the valve 21 with a control knob 23 in the cab 11. As is conventional, the knob 23 is pulled or pushed from a central rest position to raise or lower the bed 13. In particular, the valve 21 is connected by a hydraulic line 24 to the piston and cylinder assembly 15. When the knob 23 is in its central rest position, the valve 21 prevents any flow of hydraulic fluid through the line 24. To raise the bed 13, the valve 21 directs pressurized fluid from the pump 19 to flow into the line 24 and into the cylinder of the assembly 15. To lower the bed 13, the valve 21 permits the hydraulic fluid in the cylinder to be discharged through the line 24 back to the reservoir 20.

Figure 2:
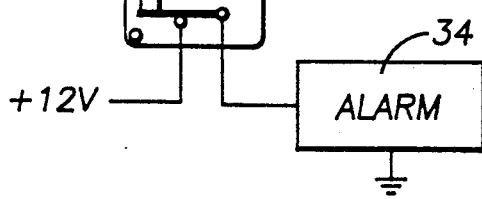
FIG. 2 is a schematic diagram of the hydraulic components in the lift mechanism used in the vehicle of FIG. 1.

Turning now to FIG. 2, the hydraulic circuits are shown in greater detail. The valve 21 is shown in its position for raising the bed. In this position, the pump 19 is connected to the line 24, and a return line 31 to the reservoir 20 is disconnected. When the valve 21 is set in its middle or rest position, the line 24 is disconnected and the pump 19 is connected to the return line 31 so as to circulate the hydraulic fluid through the pump and back to the reservoir 20. This relieves the load on the pump 19. In its third position for lowering the bed 13, hydraulic fluid from the pump 19 is still recirculated back to the reservoir 20, but the line 24 is also connected to the return line 31. Therefore, hydraulic fluid from the cylinder 32 can be discharged under pressure from the piston 33 back to the reservoir 20.

The speed at which the bed 13 is lowered is dependent upon the rate at which hydraulic fluid is discharged from the cylinder 32. In general, this rate is proportional to the pressure of the fluid in the cylinder 32 and inversely proportional to the resistance in the discharge path from the cylinder 32 back to the reservoir 20. The pressure in the cylinder 32 is proportional to the weight of the bed 13 including any load in the bed.

As a practical matter, when the bed 13 is empty, and the valve 21 is set fully in its third position, the resistance of the discharge path in the hydraulic circuit should provide a certain resistance sufficient to limit the of lowering of the bed 13 to prevent the bed 13 from being slammed onto the chassis 12. Also, as a matter of safety for any people that might be near the bed 13 when it is lowered, the bed should not be lowered at such a fast rate that any such person would be unable to move away from the danger area between the bed and the chassis. As shown in FIG. 2, for example, an alarm 34 provides a warning signal whenever a switch 35 is closed by the rod of the valve 21 being moved from its center rest position to either raise or lower the bed 13. Such an alarm, however, would be entirely useless if the bed 13 were to move so fast that a person in the danger area could not react to the alarm.

The conventional way of limiting the rate of lowering the bed 13 is to provide a restriction or throttled valve in the hydraulic line 24 from the valve 21 to the cylinder 32. During the raising of the bed 13, this restriction or resistance can be bypassed by a check valve 36 so as not to impede the raising of the bed. But the use of a restriction or throttled valve in the hydraulic line 24 has a number of disadvantages. A restriction such as a wire mesh or throttled valve is subject to plugging by rather small debris. In addition, a throttled valve must be adjusted. If this adjustment is done by a control system, additional reliability problems are introduced by potential failure modes of that control system, such as loss of electrical or pneumatic power. Moreover, unless a restriction or throttled valve is controlled, it will provide an approximately linear resistance to the flow of fluid. Therefore, the maximum rate of lowering of the bed will be proportional to the weight of the bed including any contents, and will be a function of the angle between the piston and cylinder assembly 15 and the chassis 12. These factors result in a rather dangerous situation when the bed 13 has a full load and has been raised above the chassis 12 by an amount that is just sufficient for a person's head or arms to be inserted into the danger area between the bed and chassis. Although a prudent person would not permit his head or arms to enter the danger area under these circumstances, nevertheless, more than three dozen people have died, and others have been injured by accidental lowering of the dump truck beds.

According to the present invention, the speed at which the bed of the dump truck can be lowered is limited by passing the discharge of hydraulic fluid through a fluid dynamic restrictor. In about 1954, the fluid dynamic restrictor was conceived by Victor Streeter for the Dole Valve Corporation of Chicago as a non-pluggable way to prevent the almost immediate loss of all hydraulic fluid in fighter aircraft when a hydraulic line is perforated. Such a restrictor does not provide a resistance to fluid flow by the use of a small or constricted passage for the flow of fluid. Moreover, the fluid dynamic restrictor provides a pressure drop that is proportional to the square of the fluid flow rate. Therefore, the fluid dynamic restrictor provides a nonlinear resistance to the flow of fluid. Due to this nonlinear resistance, the maximum lowering rate of the bed is much the same regardless of whether the bed is empty or full.

As shown in FIG. 2, a fluid dynamic restrictor 37 is inserted in series with the hydraulic line 24, and in parallel with the check valve 36. Preferably the fluid dynamic restrictor is disposed near the cylinder 32 to limit the rate of fluid discharge from the cylinder 32 in the event of accidental severing of the hydraulic line 24. In contrast to a linear restrictor, the fluid dynamic restrictor 37 has a resistance that is dependent on the direction of fluid flow, and has a relatively small resistance to fluid flow in the direction from the pump 19 to the cylinder 32. Therefore, it is not essential to use a check valve to bypass the fluid dynamic restrictor, although the check valve 36 would still facilitate rapid lifting of the bed.

Figure 3:
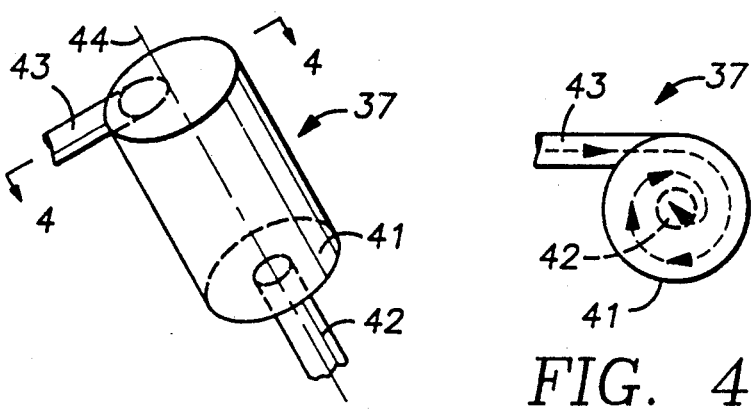
FIG. 3 is an isometric view of a fluid dynamic restrictor used in the hydraulic lift of FIG. 2 to limit the rate at which the bed is lowered to a predetermined maximum rate that is much the same regardless of whether the bed is empty or full.

Turning now to FIG. 3, the dynamic restrictor 37 is shown in greater detail. The restrictor has a body 41 that is cylindrical in shape and defines a cylindrical chamber for the fluid. To provide a high resistance to fluid flow, the fluid enters from a tangential passage 43 at the top of the chamber and exists through a port 42 at the bottom of the chamber. The tangential passage 43 lies in a plane perpendicular to the axis 44 of the cylindrical chamber. The port 42, on the other hand, is coaxial with the axis 44.

Figure 4:
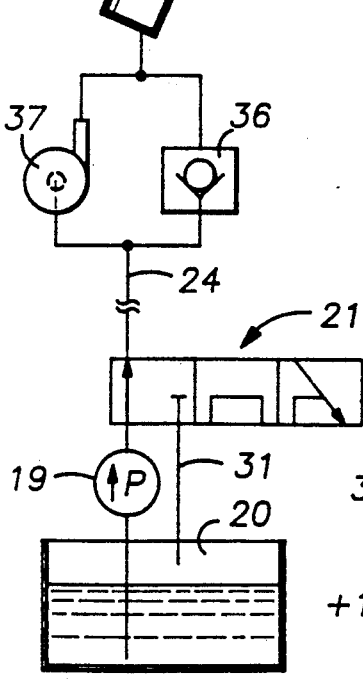
FIG. 4 is a section view of the fluid dynamic restrictor along line 4—4 of FIG. 3.

As is more clearly seen in FIG. 4, the passage 43 is approximately tangent to the cylindrical chamber. Therefore, when fluid enters the chamber from the tangential passage 43, the fluid will form a vortex as depicted by the spiral arrows in FIG. 4. In fact, the fluid may make more than a hundred revolutions before it exits through the port 42. Associated with such a vortex is a pressure drop (P) that is proportional to the square of the velocity (V) of the fluid. Assuming that the fluid has a tangential velocity that is approximately a constant function of the radius (r) from the central axis (44 in FIG. 3), then the pressure drop (P) can be computed as a function of the velocity (V) according to:

$$f = m \frac{V^2}{r}$$

$$df = (dm) \frac{V^2}{r}$$

$$df = (dr)pA \frac{V^2}{r}$$

$$\frac{df}{A} = pV^2 \frac{dr}{r}$$

$$P = pV^2 \int_{R_0}^{R_1} \frac{dr}{r}$$

$$P = pV^2 \text{Ln}(R_1/R_o)$$

where (p) is the density of the fluid, ($R_1$) is the radius of the chamber 41, ($R_0$) is the radius of the exit port 42 (dm) is an infinitesimal mass of the fluid lying outside the radius (r) and within the radius (r+dr), (A) is the area of the infinitesimal mass in the direction normal to the radial direction, and (df) is the force upon the infinitesimal mass in the radial direction balancing the acceleration of the infinitesimal mass.

The infinitesimal mass (dm) resides in a volume of (dr)(A), and consequently the value of the infinitesimal mass is (dm)=(dr)(p)(A). The pressure drop across the infinitesimal mass is (dP)=(df)/(A).

The pressure drop (P) is proportional to the weight of the truck bed and its contents, and the velocity (V) is proportional to the rate at which the bed is lowered. The rate of lowering of the bed is a square root function of the weight of the bed and its contents. This insures that the maximum lowering rate is much the same regardless of whether the bed is empty or full. Therefore, the dynamic restrictor can prevent sudden and unexpected lowering of the dump truck bed that would otherwise be caused by unusually heavy loads or a failure in the hydraulic lift controls. Since the dynamic restrictor itself has neither moving parts nor restricted passageways, it is inherently reliable and immune from clogging due to particulate contamination.

I claim:

1. A hydraulic lift mechanism for a vehicle having a chassis and a bed mounted on said chassis, said lift mechanism including a piston and cylinder coupled between said chassis and said bed, a pump for supplying fluid under pressure to said cylinder for lifting said bed from said chassis, and a fluid dynamic restrictor for defining a fluid vortex limiting a discharge of said fluid from the cylinder, whereby the speed at which the bed is lowered is limited to a safe speed when the bed has a full load.

2. The hydraulic lift mechanism as claimed in claim 1, wherein the fluid dynamic restrictor is connected near said cylinder in a fluid line from said pump to said cylinder.

3. The hydraulic lift mechanism as claimed in claim 2, further including a check valve connected across said fluid dynamic restrictor for bypassing said restrictor when said pump supplies said fluid under said pressure to said cylinder.

4. The hydraulic lift mechanism as claimed in claim 3, further including a valve for bypassing said pump when said fluid is discharged from said cylinder.

5. A hydraulic lift mechanism for a vehicle having a chassis and a bed mounted on said chassis, said lift mechanism including a piston and cylinder coupled between said chassis and said bed, a reservoir for fluid, a pump for supplying fluid under pressure along a fluid line to said cylinder for lifting said bed from said chassis, and a valve for selectively bypassing said pump to discharge fluid from said cylinder along said fluid line and back to said reservoir to lower the lifted bed back toward said chassis, and a fluid dynamic restrictor connected between said cylinder and said fluid line and disposed near said cylinder, said fluid dynamic restrictor defining a vortex of said fluid for limiting the discharge of said fluid from said cylinder, whereby the speed at which the bed is lowered is limited to a safe speed when the bed has a full load.

6. The hydraulic lift mechanism as claimed in claim 5, further including a check valve connected across said dynamic restrictor for bypassing said restrictor when said pump supplies said fluid under said pressure to said cylinder.

7. A method of raising and lowering the bed of a truck, said truck having a chassis and a cylinder and piston assembly coupled between the bed and chassis, said method comprising the steps of supplying fluid under pressure to said cylinder to raise said bed, and discharging the fluid from the cylinder through a fluid dynamic restrictor to lower said bed at a controlled rate, said fluid dynamic restrictor creating a vortex of said fluid to provide a nonlinear resistance to said discharging of said fluid.

* * * * *